(12) United States Patent
Jin et al.

(10) Patent No.: US 8,701,595 B2
(45) Date of Patent: Apr. 22, 2014

(54) PET FOOD DISPENSER

(76) Inventors: Samuel Zhihui Jin, Corona, CA (US); Wenjun Pu, Corona, CA (US)

(*) Notice: Subject to any disclaimer, the term of this patent is extended or adjusted under 35 U.S.C. 154(b) by 188 days.

(21) Appl. No.: 13/525,141

(22) Filed: Jun. 15, 2012

(65) Prior Publication Data

US 2013/0333622 A1 Dec. 19, 2013

(51) Int. Cl.
*A01K 1/10* (2006.01)
*A01K 5/00* (2006.01)
*A01K 39/00* (2006.01)

(52) U.S. Cl.
USPC .......... 119/51.11; 119/51.01; 119/51.12; 119/53

(58) Field of Classification Search
USPC .......... 119/51.11, 51.12, 52.1, 53, 51.01, 119/57.92
See application file for complete search history.

(56) References Cited

U.S. PATENT DOCUMENTS

| | | | | | |
|---|---|---|---|---|---|
| 3,920,224 | A | * | 11/1975 | Fassauer | 366/131 |
| 4,735,171 | A | * | 4/1988 | Essex | 119/51.12 |
| 6,135,056 | A | * | 10/2000 | Kuo | 119/51.11 |
| 6,401,657 | B1 | * | 6/2002 | Krishnamurthy | 119/51.11 |
| 6,988,465 | B2 | * | 1/2006 | Park | 119/51.12 |
| 7,426,901 | B2 | * | 9/2008 | Turner et al. | 119/51.02 |
| 7,984,694 | B2 | * | 7/2011 | Wu et al. | 119/51.02 |
| 8,166,922 | B2 | * | 5/2012 | Jalbert et al. | 119/501 |
| 2005/0217591 | A1 | * | 10/2005 | Turner et al. | 119/51.02 |

* cited by examiner

*Primary Examiner* — Monica Williams
(74) *Attorney, Agent, or Firm* — Clement Cheng

(57) ABSTRACT

A pet food dispenser comprising a lid and a hopper bin. The lid fits over a loading opening of the hopper bin. A main section includes a base, and the main section includes a base cover having a hopper funnel and a hopper recess. An auger assembly has an intake opening and an output opening, and the auger assembly is removably cradled in the hopper recess. When the auger assembly is operating, an auger blade is formed as a helical screw that drives articles from the intake opening to the output opening. A motor mount has a motor, and the motor is mechanically connected to the auger assembly to drive the auger assembly. The motor mount is connected to the base. A microprocessor controls actuation of the motor.

14 Claims, 6 Drawing Sheets

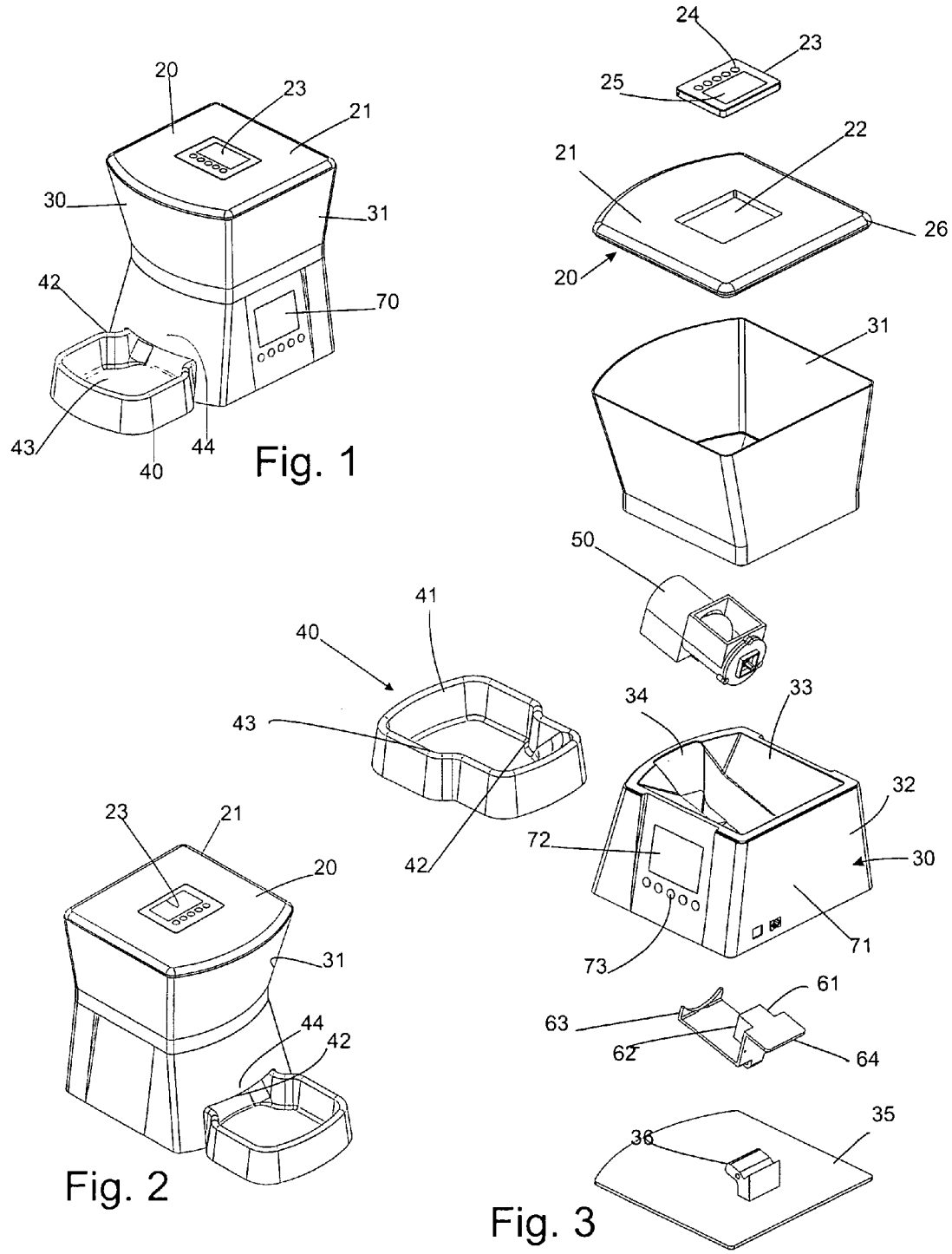

PET FOOD DISPENSER

FIELD OF THE INVENTION

The present invention is in the field of pet food dispensers, more particularly in the field of automated pet food dispensers.

DISCUSSION OF RELATED ART

An automated pet food feeder can make scheduled feeding easier. A variety of different pet food feeders have been described in patent literature.

As early as May 19, 1987, Pitchford, Jr. describes a timed automatic pet feed and water dispenser in U.S. Pat. No. 4,665,862. This apparatus includes a leveraged loading storage bin for receiving a supply of pet food, which is dispensed at predetermined time intervals controlled by a timer system. The water dispenser can also dispense water to produce a gravy and a softening of particulate feed.

For example, in U.S. Pat. No. 5,363,805 published on Nov. 15, 1994 by Wing titled automatic pet feeder, an apparatus is provided for programming the dispensing device to control the frequency and the amount of the solid food delivered into the bowl. This automatic pet feeder consists of a cabinet for storing solid food therein so a bowl may be externally positioned adjacent to the cabinet on the flat surface.

In Turner et al.'s U.S. Pat. No. 7,426,901 dated Sep. 23, 2008, an animal feeding device and method is described. This is a sophisticated pet feeding device such that it is a system designed specifically for pets with special diets. The feeder dish is made accessible only to pets carrying an ID tag that is recognized and authorized by a receiver on the device. The ID tags and device can be pre-programmed so that food is made available only for a certain time period. The appropriate amount of food is thereby made available at appropriate time intervals.

In U.S. Pat. No. 6,062,166 published on May 16, 2000, Macrina describes a pet feeding system that allows a user to monitor the operation of the pet feeding and determine whether or not the pet feeding system is operating normally by placing a phone call to his or her house. The control circuit determines the level of food and/or water to allow. The control circuit includes a telephone relay disconnect with an inlet and outlet telephone line while a regular telephone answering machine is attached to an outlet line from the automatic feeder so that when an interruption in the system's operation is encountered the telephone answering machine is disconnected through the relay altering the user to a feeding system malfunction.

In U.S. Pat. No. 5,299,529 dated Apr. 5, 1994, Ramirez describes an automatic feeder for dogs and other animals as a computerized dispenser for dispensing different programmed quantities of food for each meal to an animal at up to ten programmed times. This complex feeder includes a control circuitry such as a digital voice circuit that allows for recording and playing audio in order to enable an owner to record message for automatic playback at preprogrammed times, normally just head of feeding time.

Parks describes an automatic animal feeder and water dispenser in U.S. Pat. No. 4,688,520 on Aug. 25, 1987. This automatic animal feeder and water dispenser dispenses animal food at predetermined times and in variable quantities. The water dispenser can also be activated by the timer to wet the supply of pet food.

On Jun. 11, 2002, Krishnamurthy describes United States patent publication U.S. Pat. No. 6,401,657 B1 as an automatic pet food feeder. This complex device consists of a motorized pet food feeder having a food storage bin with a top and a bottom, wherein the bottom is open. A motor is mounted onto the device with a rotatable shaft so that the pet food feeder can be adapted to be used with various timing and sensing devices that control the actuation of the motor and the duration of activation, thereby controlling the amount of food transported.

SUMMARY OF THE INVENTION

A pet food dispenser can be automated having a preprogrammed schedule on a computer that has a screen and control buttons. The pet food dispenser computer controls the motor that drives the auger for dispensing food. The auger is removable from an installed position to a detached position for easy cleaning.

A pet food dispenser comprising a lid and a hopper bin. The lid fits over a loading opening of the hopper bin. A main section includes a base, and the main section includes a base cover having a hopper funnel and a hopper recess. An auger assembly has an intake opening and an output opening, and the auger assembly is removably cradled in the hopper recess. When the auger assembly is operating, an auger blade is formed as a helical screw that drives articles from the intake opening to the output opening. A motor mount has a motor, and the motor is mechanically connected to the auger assembly to drive the auger assembly. The motor mount is connected to the base. A microprocessor controls actuation of the motor.

The lid has a lid top surface that is formed with a lid recess, and a remote control module is docked to the lid recess. A remote control module has a plurality of wireless controls. The remote control module has a remote screen and the lid recess is configured to provide the remote control module a tilted dock position. The motor mount includes a motor stand that has a pivot so that the motor mount is pivotally attached to the base. The tray has tray walls surrounding a tray depression, and a portion of the tray walls forms a tray ramp for receiving pet food. The tray opening is formed on a front surface of the main section, and the tray opening is sized to receive at least a portion of the tray ramp.

The auger assembly includes a blade mounted on a shaft. The shaft is mounted on a first bushing and a second bushing. A drive head is formed on the shaft. The auger assembly has a generally circular end plate having an intake shaft mount. The auger assembly includes an output shaft mount formed on a housing of the auger assembly. A blade is mounted on a shaft, and the shaft is mounted on a first bushing and a second bushing. A drive head is formed on the shaft on an end of the shaft. The auger assembly further includes a generally circular end plate and an auger assembly connector formed on the generally circular end. The auger assembly connector connects with a motor mount connector.

It is an object of the present invention to have a removable auger assembly module to provide easier cleanup of accumulated food and germs on the dispensing system and to prevent potential diseases thereby keeping pets healthy.

BRIEF DESCRIPTION OF THE DRAWINGS

FIG. 1 is a front right view of the pet food dispenser.
FIG. 2 is a front left view of the pet food dispenser.
FIG. 3 is an exploded view of the pet food dispenser.

Figure 4:
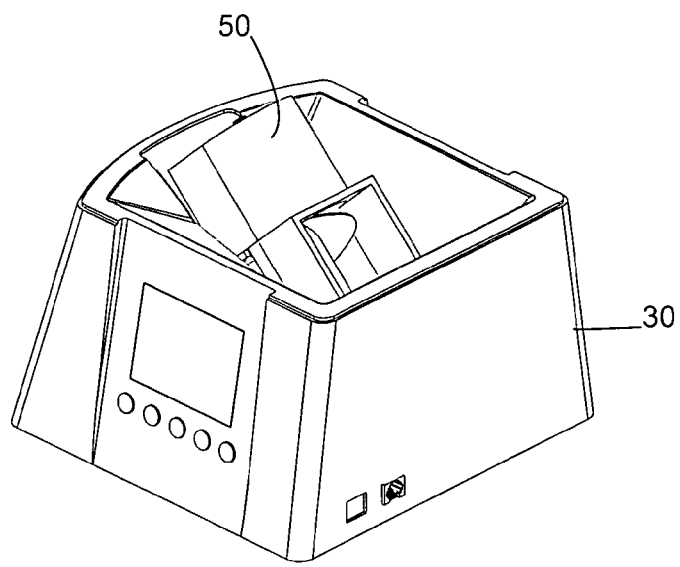
FIG. 4 is a diagram showing the auger module in cradle position.

The following call list of elements is a useful guide in referencing the element numbers of the drawings.

20 Lid
21 Lid Top Surface
22 Lid Recess
23 Remote Control Module
24 Wireless Controls
25 Remote Screen
26 Lid Indent
30 Main Section
31 Hopper Bin
32 Base Cover
33 Hopper Funnel
34 Hopper Recess
35 Base
36 Motor Stand
40 Tray
41 Tray Walls
42 Tray Ramp
43 Tray Depression
44 Tray Opening
50 Auger Assembly
51 Intake Opening
52 Output Opening
152 Output Shaft Mount
53 Blade
54 First Bushing
55 Second Bushing
56 Drive Head
57 Shaft
58 End Plate
158 Screw
258 Intake Shaft Mount
59 Circlip
61 Motor Mount
62 Square Socket
63 Forward Extension Flange
64 Rear Extension Flange
70 Computer
71 Data Ports
72 Main Screen
73 Main Controllers
74 Ethernet Connector
75 Phone Plug Connector
81 Motor
82 Motor Socket

DETAILED DESCRIPTION OF THE PREFERRED EMBODIMENTS

FIG. 1 shows a front perspective right view of the present invention having a lid 20 over a main section 30. A tray is installed in the main section 30 through a tray opening 44. The unit can rest on the floor and have a removable bowl shaped as a tray that also rests on the floor. The removable bowl preferably has a flat bottom and can be formed from stainless steel for ease of cleaning.

The main section 30 has a hopper bin 31 that receives dry pet food such as rabbit pellets. The hopper bin sits on top of the base cover 32. The base cover 32 houses an upper rim shaped to receive a lower end of the hopper bin 31. The hopper funnel 33 supports the hopper bin and assists in receiving dry pet food and directing dry pet food to the auger assembly 50. The hopper bin can also be made of stainless steel instead of plastic.

A lid 20 is sometimes necessary to keep the food fresh and secure. It is preferred that the lid 20 have a lid indent 26. The lid indent 26 preferably has an elastomeric seal that seals and structurally connects to the hopper bin 31. The lid has a lid top surface 21. The lid top surface 21 has a lid recess 22 that may receive a remote control module 23. The wireless controls 24 are disposed on the remote control module which can be removed and magnetically adhered to a refrigerator. The remote screen 25 can be mounted on the remote control module 23 so that pet food data can be displayed on a liquid crystal display of the remote screen 25.

The hopper recess 34 provides a downward opening and is formed on the hopper funnel 33. The hopper funnel 33 funnels the pet food to the hopper recess 34. The base cover 32 can be integrally formed with the hopper funnel 33, or can be separately formed and later bonded to the hopper funnel 33. The base cover 32, the lid 20 and the hopper bin 31 can be made from plastic injection molding techniques.

The base cover 32 fits over the base 35. The motor stand 36 may have a pivot allowing the motor 82 to pivot on the motor stand 36. The motor has a motor socket 81 that receives the drive head 56 and can both have a hexagonal profile.

The auger assembly 50 fits in the hopper recess 34. The auger assembly 50 preferably fits over a forward extension flange 63. An auger assembly connector can be formed as a square plug. The auger assembly connector connects to the motor mount connector to resist rotation of the auger assembly. The motor mount connector can be formed as a square socket 62. The auger assembly 50 has a square plug for mechanical connection to a square socket 62 of the motor mount 61. A rear extension flange 64 may provide additional stability for the auger assembly 50 and the motor mount 61. The motor is mounted within the motor mount 61 and is preferably electrically powered such as by direct current. Direct current is available from a power transformer that plugs to household electric current.

The square socket of the motor mount 61 may receive the square plug of the auger assembly. This configuration could also be reversed so that a square plug of the motor mount 61 may receive a square socket of the auger assembly. The square socket 62 has sufficient depth to prevent turning of the auger assembly relative to the motor mount 61. A pair of tips formed on the forward extension flange 63 extend upward to grasp and retain the auger assembly 50 against the motor mount 61. The forward extension flange 63 is preferably formed as a spring, which can be made as a resilient member such as from a metal or plastic material. When formed as a spring, the forward extension flange is a forward extension flange clip. The stiffness of the forward extension flange clip is tight enough to retain the auger assembly during use, but loose enough so that a user can pull away the auger assembly 50 from the forward extension flange clip.

Figure 5:
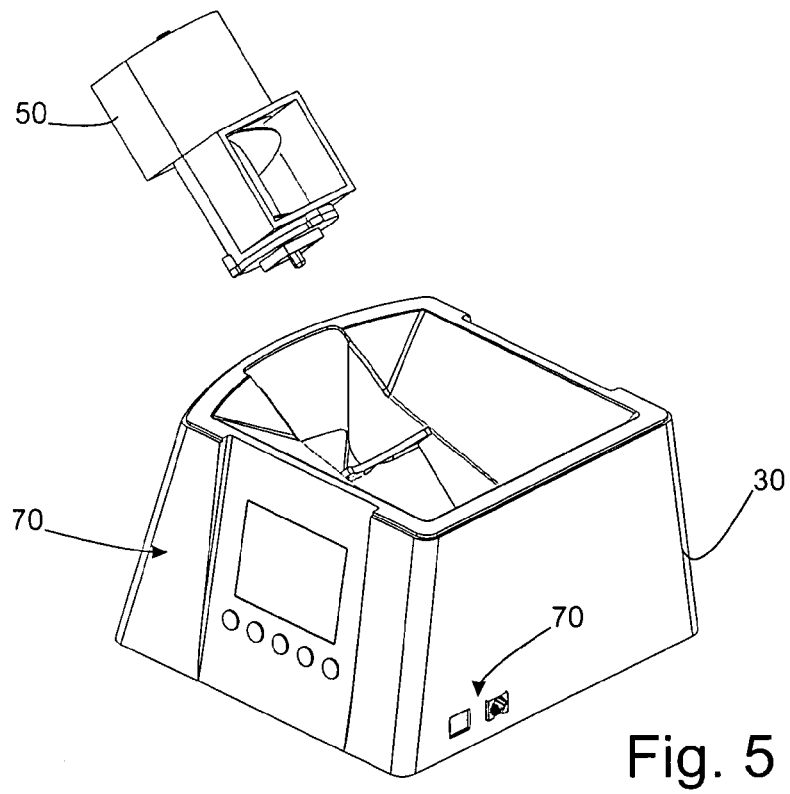
FIG. 5 is a diagram showing removal of the auger module from the cradle position.
Figure 6:
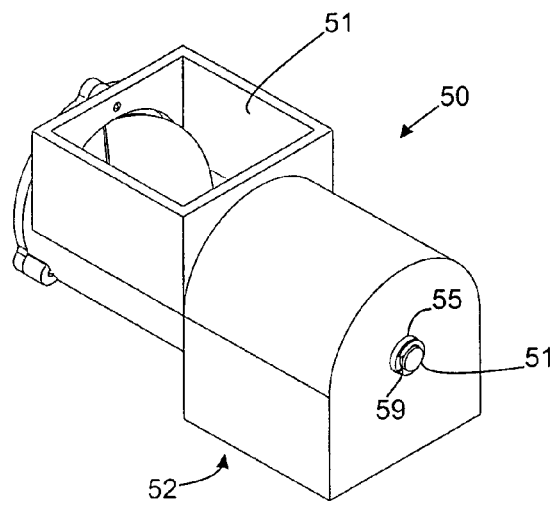
FIG. 6 is a diagram of the auger unit in assembled configuration.

The auger assembly 50 fits in the hopper recess 34 at an angle such as the 45° angle shown in FIGS. 4 and 5. The auger assembly is tilted upward so that the intake opening 51 is below the output opening 52. Optionally, the auger assembly 50 is mounted on a forward extension flange 63 which is a part of the motor mount 61. The motor mount 61 is optionally pivotally attached to a motor stand. The motor mount 61 can be pivoted forward so that the auger assembly 50 is horizontal rather than angled upward at a 45° angle. Optionally, the motor stand 36 can be spring-loaded so that it is somewhat biased upward for ease of removal of the auger assembly 50. Optionally, the motor mount 61 is motor driven by a secondary motor so that the secondary motor can raise and lower the auger assembly 50 between the 45° angle position and the horizontal position.

The tray 40 has tray walls 41 and a tray ramp 42. The tray ramp 42 fits inside the tray opening 44 of the base cover 32. The tray depression 43 receives the pet food that slides down the tray ramp 42 when the auger assembly 50 is activated. The tray ramp 42 fits underneath the output opening 52 of the auger assembly 50. The output opening 52 faces downward toward the tray ramp 42. The auger assembly intake opening 51 faces upward and receives pet food from the hopper funnel 33.

The auger assembly 50 generally has an intake opening 51 and an output opening 52 for respectively receiving pet food into the auger assembly and dispensing pet food out of the auger assembly. The auger assembly has an auger within it which has a blade 53 formed as a helical screw. The helical screw is mounted on a shaft 57. The shaft 57 has a pair of bushing receiving ends that fit to bushings. A first bushing receiving end of the shaft 57 fits to a first bushing 54 and a second bushing receiving end of the shaft 57 fits to a second bushing 55. The bushings can be made as bearings such as ball bearings or pin bearings. When formed as bearings, the pin bearings can be made as one-way bearings. The first bushing receiving end of the shaft 57 extends to a drive head 56. The drive head 56 can be driven by the motor. The drive head 56 can be decoupled from a socket of the motor shaft. The motor shaft has a driving socket for driving the drive head 56. The motor movement is controlled by the computer which may have a calendar schedule or timer program stored in flash memory.

Figure 7:
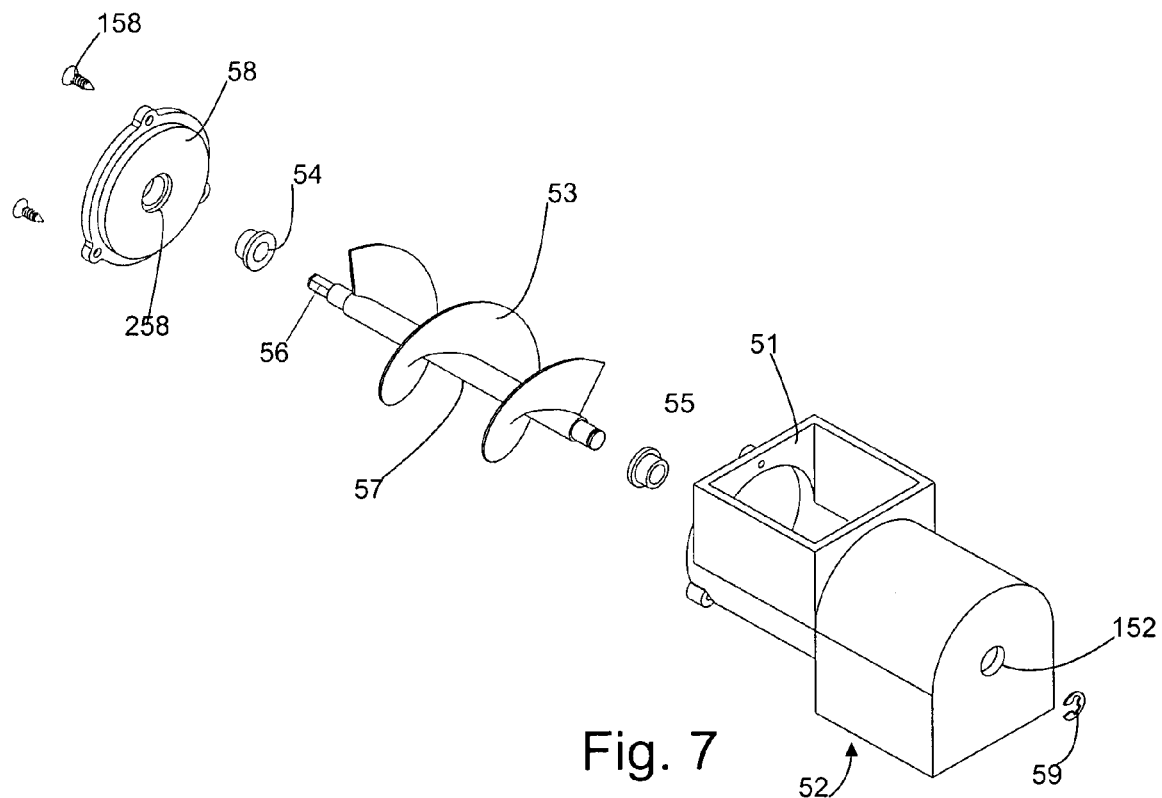
FIG. 7 is a diagram of the auger unit in exploded view.
Figures 8, 9:
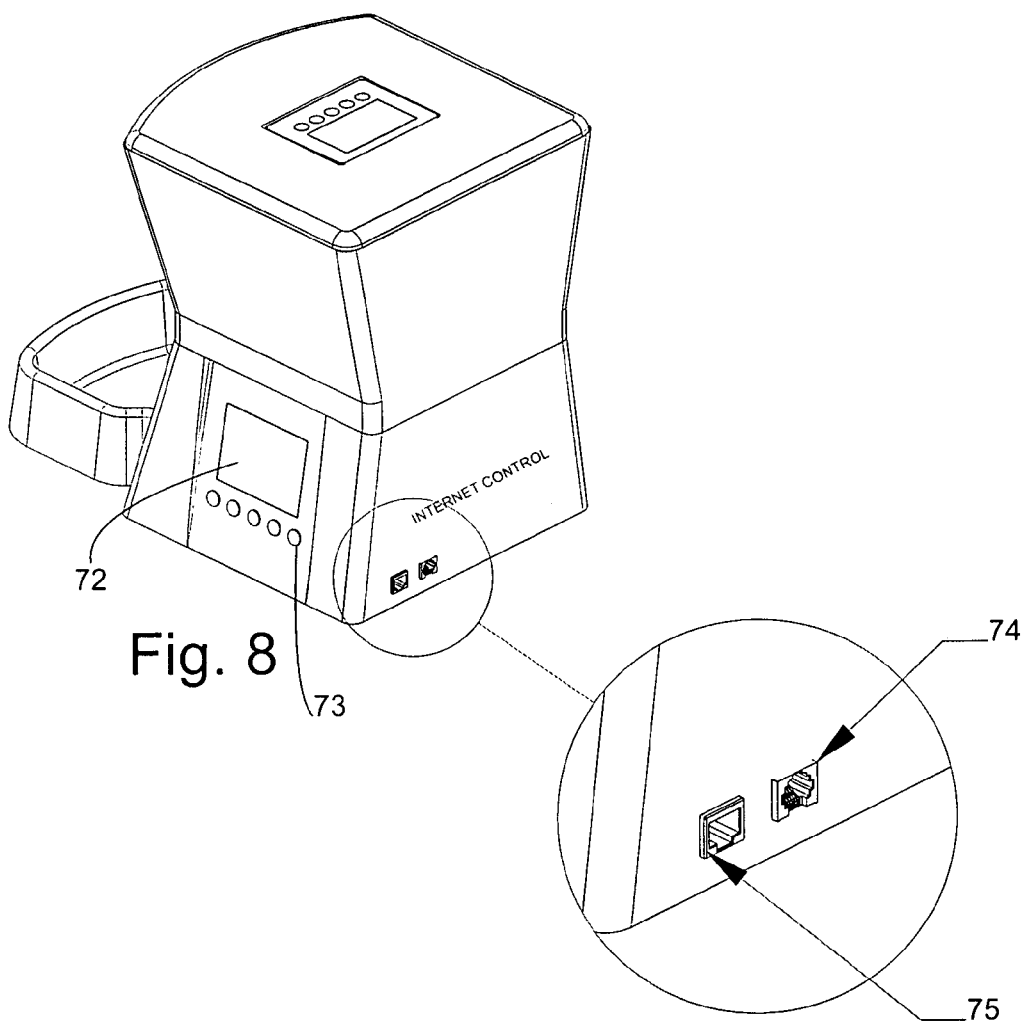
FIG. 8 is a rear view of the dispenser unit showing the data ports.
FIG. 9 is a close-up view of the Ethernet and phone plug.
Figure 10:
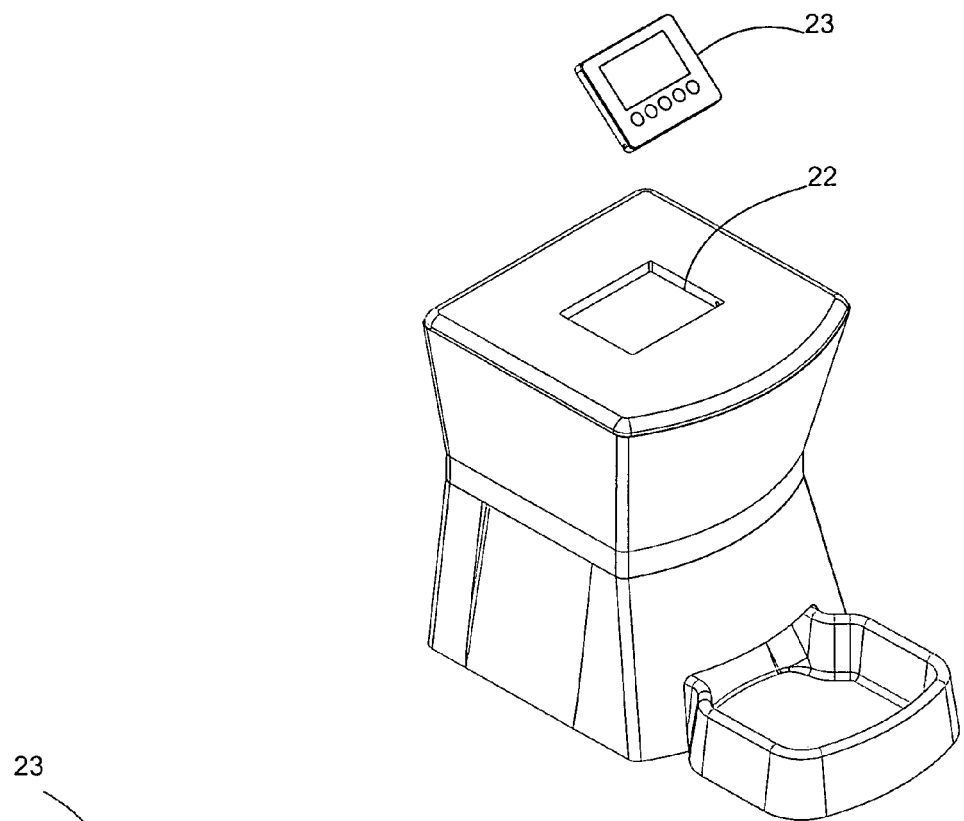
FIG. 10 is a diagram of the wireless remote control removed from the automated pet food dispenser.
Figure 11:
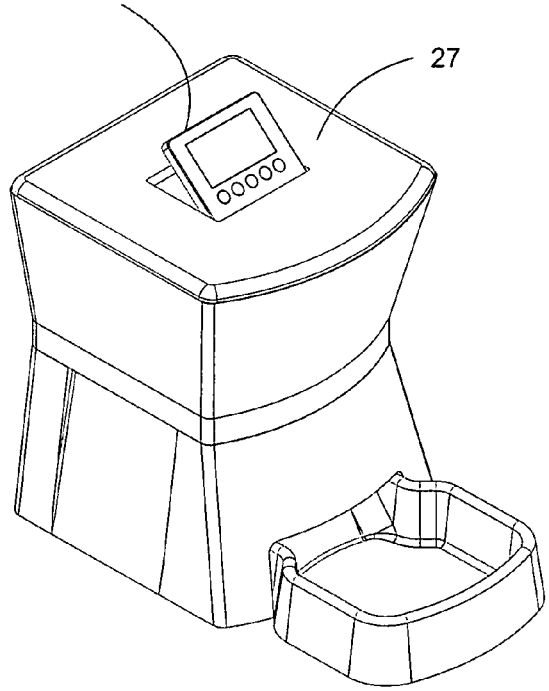
FIG. 11 is a diagram of the wireless remote control in a swivel docked position.
Figure 12:
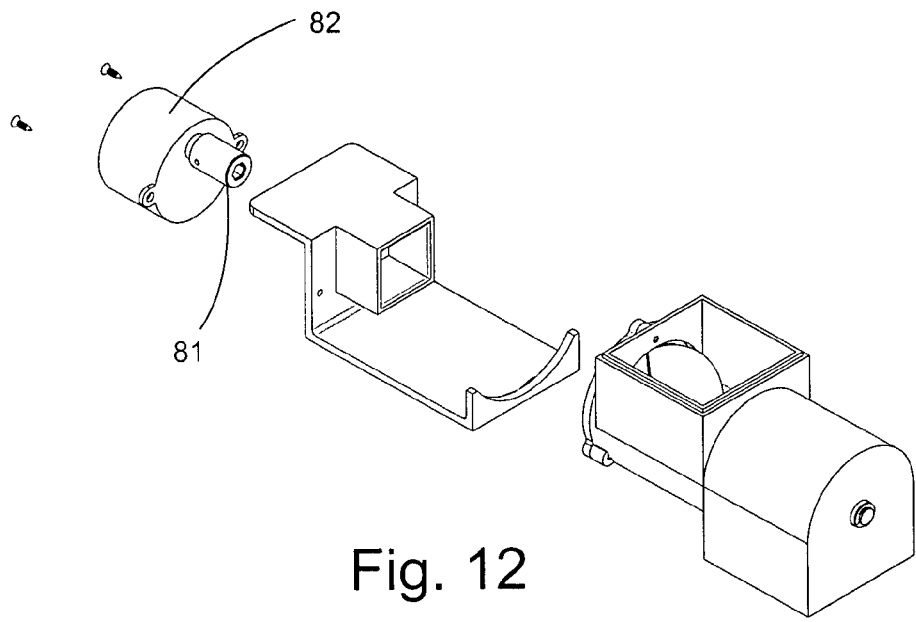
FIG. 12 is a diagram of the position of the motor.
Figure 13:
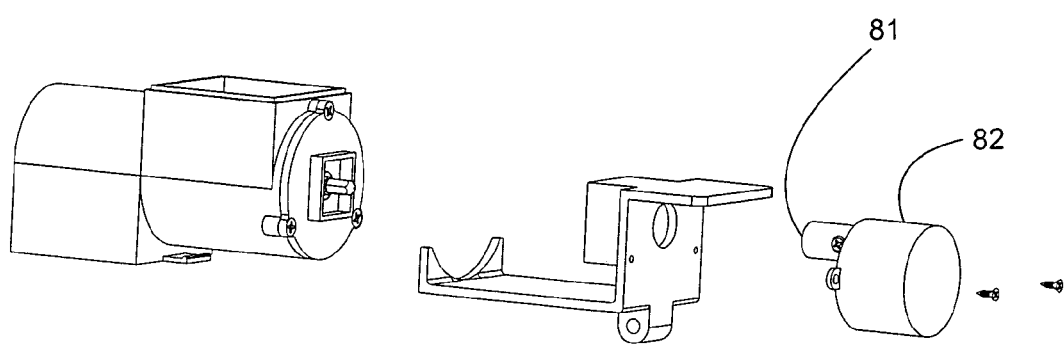
FIG. 13 is a side view diagram of the position of the motor.

The auger assembly 50 can be disassembled and reassembled. The auger assembly 50 can be removed from the hopper recess 34 without tools. The first bushing 54 fits into an intake shaft mount 258 of the end plate 58. Screws 158 fit into screw openings formed on the end plate. The screws 158 connect to the end plate to the body of the auger assembly 50. FIG. 7 shows that the auger assembly can be disassembled and reassembled. The three screws 158 can be oriented at 120° from each other and extended into an input opening exterior side wall near the intake opening 51. The output opening 52 can have an output opening side wall having an output shaft mount 152. A circlip 59 is mounted external to the auger assembly and can secure a second end of the shaft 57 and also secure the second bushing 55. The second end of the shaft 57 has a circlip slot along its circumference to allow installation of the circlip 59. It is preferred to use circlip pliers to install the circlip.

The computer 70 has the main screen 72 for providing pet food data such as schedule programming, wireless configuration and Ethernet configuration. The main screen 72 can be supplemented by speakers mounted a side or near the main screen 72. The main screen 72 can provide user entertainment and display data. The computer 70 can play preprogrammed scheduled music or a tune from the speakers and output visual stimuli to the pet to summon the pet for feeding. Data ports 71 may include an Ethernet connector 74 or a phone plug connector 75. Main controllers 73 can be formed as pushbuttons located beneath the main screen 72. The main screen 72 can also provide a visual indicator to the user or pet as to the amount of food remaining or other status. Ethernet connector 74 can be used for connecting the pet food dispenser to an Ethernet network. With an IP address, firmware can be built into the computer 70. The phone plug connector can receive and output commands through a regular telephone. The phone plug connector may allow a user to make changes to the schedule, make a telephone call to the pet, or listen to the pet such as during feeding for remote monitoring of the pet.

The remote control preferably has a tilt position 27 where the remote control can be docked at a tilted angle for viewing the remote control. The remote control and the computer may both have a microprocessor such as a CPU or electronic circuit or the like for operating the logical features of the remote control or computer.

The invention claimed is:

1. A pet food dispenser comprising:
   a. a lid;
   b. a hopper bin, wherein the lid fits over a loading opening of the hopper bin;
   c. a main section including a base, the main section including a base cover having a hopper funnel and a hopper recess;
   d. an auger assembly having an intake opening and an output opening, wherein the auger assembly is removably cradled in the hopper recess; wherein when the auger assembly is operating, an auger blade formed as a helical screw drives articles from the intake opening to the output opening, wherein the auger assembly further comprises a generally circular end plate having an intake shaft mount, wherein the auger assembly further includes an output shaft mount formed on a housing of the auger assembly;
   e. a motor mount having a motor, wherein the motor is mechanically connected to the auger assembly to drive the auger assembly; wherein the motor mount is connected to the base;
   f. a microprocessor controlling actuation of the motor.

2. The pet food dispenser of claim 1, wherein the lid has a lid top surface that is formed with a lid recess, and further comprising a remote control module docked to the lid recess, wherein the remote control module has a plurality of wireless controls.

3. The pet food dispenser of claim 2, wherein the remote control module has a remote screen and wherein the lid recess is configured to provide the remote control module a tilted dock position.

4. The pet food dispenser of claim 1, wherein the motor mount further includes a motor stand that has a pivot so that the motor mount is pivotally attached to the base.

5. The pet food dispenser of claim 1, further comprising a tray having tray walls surrounding a tray depression, wherein a portion of the tray walls forms a tray ramp for receiving pet food.

6. The pet food dispenser of claim 5, further comprising a tray opening formed on a front surface of the main section, wherein the tray opening is sized to receive at least a portion of the tray ramp.

7. The pet food dispenser of claim 1, wherein the auger blade is mounted on a shaft, wherein the shaft is mounted on a first bushing and a second bushing, wherein a drive head is formed on the shaft.

8. The pet food dispenser of claim 1, wherein the auger assembly further includes an auger assembly connector formed on the generally circular end, wherein the auger assembly connector connects with motor mount connector.

9. The pet food dispenser of claim 8, wherein the motor mount connector is a square socket.

10. The pet food dispenser of claim 1, wherein the motor mount further includes a forward extension flange supporting the auger assembly, wherein the forward extension flange further includes a pair of tips to support the auger assembly.

11. The pet food dispenser of claim 1, wherein the microprocessor is a computer that has data ports including an Ethernet port for connecting to an Ethernet network.

12. The pet food dispenser of claim 1, wherein the microprocessor is a computer that has a phone plug connector.

13. The pet food dispenser of claim 1, wherein the microprocessor is a computer that includes a main screen and main controllers.

14. The pet food dispenser of claim 1, wherein the microprocessor is a computer that has a calendar schedule for managing pet food dispensing times and amounts.

\* \* \* \* \*